United States Patent Office 3,002,986
Patented Oct. 3, 1961

3,002,986
SILOXANE ALUMINUM COMPOUNDS
James F. Hyde, Midland, Mich., assignor to Dow Corning Corporation, Midland, Mich., a corporation of Michigan
No Drawing. Filed Oct. 23, 1959, Ser. No. 848,228
2 Claims. (Cl. 260—448)

This invention relates to polymeric materials having both silicon and aluminum atoms in the polymer chains.

It is the object of this invention to provide novel compositions of matter which are useful as water repellents and as emulsifying agents for water-in-oil emulsions.

This invention relates to compositions of the unit formula $(YX)_z$ in which Y has a cyclic structure of the empirical formula $-O[R_2SiO_2Al]_2O-$, X is of the formula

and $z$ is an integer of at least 1, in which composition esesntially all of the valences of the silicon atoms not satisfied by R groups are satisfied by oxygen atoms and essentially all of the valences of the aluminum atoms are satisfied by oxygen atoms and in which composition each R is a monovalent hydrocarbon radical.

The term "essentially all" means that there can be attached to some of the Si atoms OH groups, OM groups or alkoxy groups which are due to incidental hydrolysis or incomplete reaction. It also means that the Al atoms can be attached to some OH or Cl groups due to incomplete reaction or incidental hydrolysis.

The cyclic Y group can be of two structural configurations

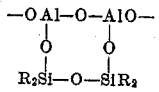

hereinafter designated

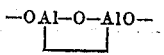

and

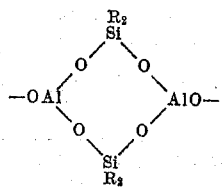

hereinafter designated

Thus it can be seen that the compositions $(YX)_z$ can be linear in structure such as

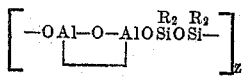

or

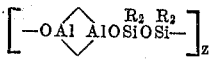

It is also clear that the compositions of this invention can be polycyclic in structure. The simplest cyclic is a bicyclic compound of the structural formula

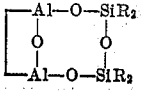

or

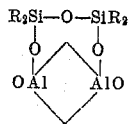

These compounds each contain one (YX) unit. The cyclic compounds can also contain multiples of the (YX) unit such as

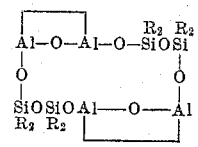

or

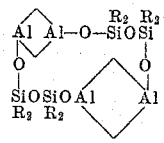

or

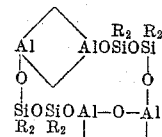

or larger cyclic molecules of these configurations containing more than two (YX) units each.

The compositions of this invention are best prepared by reacting approximately equimolar proportions of (1) cyclic compounds of the formula

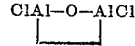

or

with (2) compounds of the formula

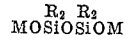

where M is an alkali metal and R is as above defined. This reaction is best carried out in a mutual solvent such as ethers such as diethylether, dibutylether or amines such as pyridine. If desired, mixed solvents such as mixtures of hydrocarbons with ethers or halogenated hydrocarbons with ethers can be employed. It is desirable that the reaction be carried out under anhydrous conditions since water tends to hydrolyze both the aluminum bonded chlorine and the SiOAl bonds.

The reaction of this invention can produce any of the complex structures shown above and generally in any one reaction a mixture of compounds having the above structures is obtained. The progress of the reaction is indicated by the precipitation of MCl which is a by-product of the reaction. The lower molecular weight products of this invention are soluble in the reaction solvents and can be recovered therefrom by evaporation of the solvent.

The starting materials (1) of this invention can be prepared by reacting aluminum chloride with completely condensed diorganosiloxanes in accordance with the method shown in U.S. Patent 2,645,654. Briefly the siloxane and aluminum chloride are heated at temperatures of 100 to 130° C. under anhydrous conditions. This results in the formation of chlorosiloxanes and the cyclic compounds (1). In general, the reaction produces a mixture of cyclics of the structure ClAl—O—AlCl
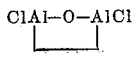

and

The alkali metal salts (2) employed in this invention are best prepared by reacting ethoxysilanes of the formula $R_2Si(OC_2H_5)_2$ with alkali metal alkoxides under substantially anhydrous conditions as shown in U.S. Patent 2,567,110.

For the purpose of this invention R can be any monovalent hydrocarbon radical such as aliphatic hydrocarbon radicals such as methyl, ethyl, butyl, t-butyl, octadecyl, myricyl, vinyl, allyl, hexenyl, octadecenyl, butadienyl and propargyl; cycloaliphatic hydrocarbon radicals such as cyclopentyl, cyclohexyl, cyclohexenyl and methylcyclohexenyl; aromatic hydrocarbon radicals such as phenyl, xenyl, naphthyl, tolyl, xylyl and styryl and alkaryl hydrocarbon radicals such as benzyl, beta-phenylethyl and beta-ethylstyryl.

The following examples are illustrative only and should not be construed as limiting the invention which is properly delineated in the appended claims. The following abbreviations are used below: Me for methyl, Et for ethyl, Vi for vinyl and Ph for phenyl.

*Example 1*

46.6 g. of a mixture of

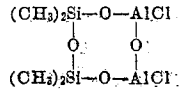

and

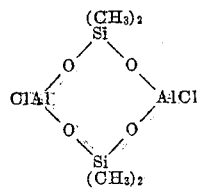

were dissolved in 50 cc. of dry benzene. 31.5 g. of $NaO[(CH_3)_2SiO]_2Na$ were added as a dry powder. 30 cc. of dry ether were then added and the reaction mixture was stirred for 2 days. It was then filtered to remove the precipitated sodium chloride together with a complex polymeric material. The solvent was then evaporated whereupon there was obtained a light straw-colored friable material which was a mixture of compounds of the formulae

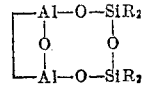

and

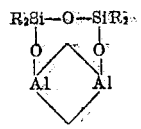

The insoluble polymeric material which was precipitated during reaction was a mixture of materials having cyclic and linear configurations such as those set forth in column 1.

*Example 2*

When the following siloxane-aluminum compounds are reacted with the following alkali metal silanol salts the following products are obtained.

| Aluminum compound | Salt | Product |
|---|---|---|
| $\begin{array}{c}\text{Me}\\ C_{18}H_{37}Si\text{—}O\text{—}AlCl\\ \mid\qquad\mid\\ O\qquad O\\ \mid\qquad\mid\\ C_{18}H_{37}Si\text{—}O\text{—}AlCl\end{array}$ | $\left[\begin{array}{c}C_{18}H_{37}\\ KOSi\text{—}\\ Me\end{array}\right]_2 O$ | $\begin{array}{c}\text{Me}\qquad\text{Me}\\ C_{18}H_{37}Si\text{—}O\text{—}Al\text{—}O\text{—}SiC_{18}H_{37}\\ \mid\qquad\mid\qquad\mid\\ O\qquad O\qquad O\\ \mid\qquad\mid\qquad\mid\\ C_{18}H_{37}Si\text{—}O\text{—}Al\text{—}O\text{—}SiC_{18}H_{37}\\ \text{Me}\qquad\text{Me}\end{array}$ |
| $\begin{array}{c}Ph_2Si\text{—}O\text{—}AlCl\\ \mid\qquad\mid\\ O\qquad O\\ \mid\qquad\mid\\ Ph_2Si\text{—}O\text{—}AlCl\end{array}$ | $\begin{array}{c}\text{Vi Vi}\\ LiOSiOSiOLi\\ \text{Et Et}\end{array}$ | $\left[\begin{array}{c}\text{Vi Vi}\\ \text{—}Al\text{—}O\text{—}Al\text{—}O\text{—}SiOSiO\text{—}\\ \mid\qquad\mid\qquad\text{Et Et}\\ O\qquad O\\ \mid\qquad\mid\\ Si\text{—}O\text{—}Si\\ Ph_2\qquad Ph_2\end{array}\right]_{10}$ |
| $\begin{array}{c}(C_6H_{11})_2\\ Si\\ O\diagup\;\diagdown O\\ ClAl\qquad AlCl\\ O\diagdown\;\diagup O\\ Si\\ (C_6H_{11})_2\end{array}$ | $\left[\begin{array}{c}(C_6H_{11})_2\\ NaOSi\text{—}\end{array}\right]_2 O$ | $\left[\begin{array}{c}(C_6H_{11})_2\\ Si\\ O\diagup\;\diagdown O\qquad (C_6H_{11})_2\;(C_6H_{11})_2\\ \text{—}Al\qquad Al\text{—}O\text{—}Si\quad O\quad Si O\text{—}\\ O\diagdown\;\diagup O\qquad (C_6H_{11})_2\;(C_6H_{11})_2\\ Si\\ (C_6H_{11})_2\end{array}\right]_{20}$ |
| $\begin{array}{c}Vi_2\\ Si\\ O\diagup\;\diagdown O\\ ClAl\qquad AlCl\\ O\diagdown\;\diagup O\\ Si\\ Vi_2\end{array}$ | $\begin{array}{c}\text{Me}\qquad\text{Me}\\ NaOSi\;\;O\;\;SiONa\\ \text{Me}\qquad\text{Me}\end{array}$ | $\left[\begin{array}{c}Vi_2\\ Si\\ O\diagup\;\diagdown O\qquad\text{Me}\qquad\text{Me}\\ \text{—}Al\qquad Al\text{—}O\text{—}Si\;\;O\;\;Si O\text{—}\\ O\diagdown\;\diagup O\qquad\text{Me}\qquad\text{Me}\\ Si\\ Vi_2\end{array}\right]_{10}$ |

That which is claimed is:

1. A composition of matter of the unit formula $(YX)_z$ in which Y has a cyclic structure and is of the formula $-O[R_2SiO_2Al]_2O-$, X is of the formula $$-\overset{R_2}{\underset{}{Si}}O\overset{R_2}{\underset{}{Si}}-$$

and z is an integer from 1 to 20 inclusive in which composition R is a monovalent hydrocarbon radical of from 1 to 30 inclusive carbon atoms, any valences of the silicon atoms not satisfied by R groups and oxygen atoms being satisfied by radicals selected from the group consisting of hydroxyl, alkoxy and OM where M is an alkali metal and in which composition any valences of the aluminum atoms not satisfied by oxygen atoms being satisfied by substituents selected from the group consisting of hydroxyl groups and chlorine atoms.

2. A composition in accordance with claim 1 in which each R is methyl.

No references cited.